(12) United States Patent
Tung

(10) Patent No.: US 6,691,424 B1
(45) Date of Patent: Feb. 17, 2004

(54) DISPLACEMENT MEASURING DEVICE

(76) Inventor: Yu-Lung Tung, No.232, Sec.2, Tianshin Rd., Fengyuan City, Taichung (TW)

( * ) Notice: Subject to any disclaimer, the term of this patent is extended or adjusted under 35 U.S.C. 154(b) by 0 days.

(21) Appl. No.: 10/313,460

(22) Filed: Dec. 6, 2002

(51) Int. Cl.[7] .................................................. G01B 3/12
(52) U.S. Cl. ........................... 33/711; 33/1 PT; 33/1 N; 33/773; 33/735; 33/753
(58) Field of Search ........................... 33/710, 711, 772, 33/773, 775, 776, 1 PT, 1 N, 734, 735, 753

(56) References Cited

U.S. PATENT DOCUMENTS

| | | | | |
|---|---|---|---|---|
| 1,863,007 A | * | 6/1932 | Elkins | 33/711 |
| 2,105,703 A | * | 1/1938 | Self | 33/711 |
| 2,488,237 A | * | 11/1949 | Raible | 33/711 |
| 2,568,524 A | * | 9/1951 | Verderber | 33/711 |
| 3,926,062 A | * | 12/1975 | Neff | 33/711 |

* cited by examiner

Primary Examiner—Diego Gutierrez
Assistant Examiner—Yaritza Guadalupe
(74) Attorney, Agent, or Firm—Charles E. Baxley

(57) ABSTRACT

A displacement measuring device includes a body which is movable on a plurality of rails and driven by a first shaft. An extension portion is connected to the body and a second shaft connected to the body extends through the extension portion. A first gear and a second gear are respectively mounted to the first shaft and the second shaft. Both of the two gears are engaged with a rack. A spring is received in the extension portion and pushes the second gear so that the second gear is pushed toward the rack. The second gear is snugly engaged with the rack so that the tolerance therebetween is reduced. A counting member is connected to the second shaft so that the number of the revolution of the second gear is counted and the sum of the displacement of the object can be precisely calculated.

2 Claims, 4 Drawing Sheets

DISPLACEMENT MEASURING DEVICE

FIELD OF THE INVENTION

The present invention relates to a displacement measuring device that includes a gear mounted to shaft and engaged with a rack. The gear is pushed toward the rack by a spring so that the displacement of the diameter of the revolutions of the shaft can be precisely measured.

BACKGROUND OF THE INVENTION

A conventional displacement measuring device for measuring the sum of displacement of the diameter of a shaft is shown in FIG. 1 and generally includes a body 10 which is moved transversely relative to rails and a shaft 11 is rotatably connected to the body 10 and driven by a driving means which is not shown in the drawings. A gear 14 is mounted to the shaft 11 and a rack 16 is engaged with the gear 14. When the body 10 is moved, the gear 14 engaged with the rack 16 rotates and the number of the revolution of the gear 14 is counted by a counting member 13 connected to an end of the shaft 11. The sum of the displacement of the object 10 can be measured by calculating the number of revolution of the shaft 11 times the diameter of the shaft 11. As shown in FIG. 2, there is a gap "D" between the tooth of the rack 16 that is engaged with the tooth of the gear 14. In other words, a tolerance is generated when a tooth of the gear 14 engages with the tooth of the rack 16 so that the sum of the displacement of the object 10 is not precise enough.

The present invention intends to provide a displacement measuring device wherein a spring pushes the gear toward the rack so that the gap "D" is reduced and the tolerance is reduced.

SUMMARY OF THE INVENTION

In accordance with one aspect of the present invention, there is provided a displacement measuring device which comprises a body which is movable on a plurality of rails and an extension portion is connected to the body and includes a spring received therein. A first shaft and a second shaft are connected to the body which is driven by the first shaft. A first gear and a second gear are respectively mounted to the first shaft and the second shaft. The second shaft extends through the extension portion and a counting member is connected to the second shaft. A rack is engaged with the first gear and the second gear. The spring pushes the second shaft so as to push the second gear toward the rack.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
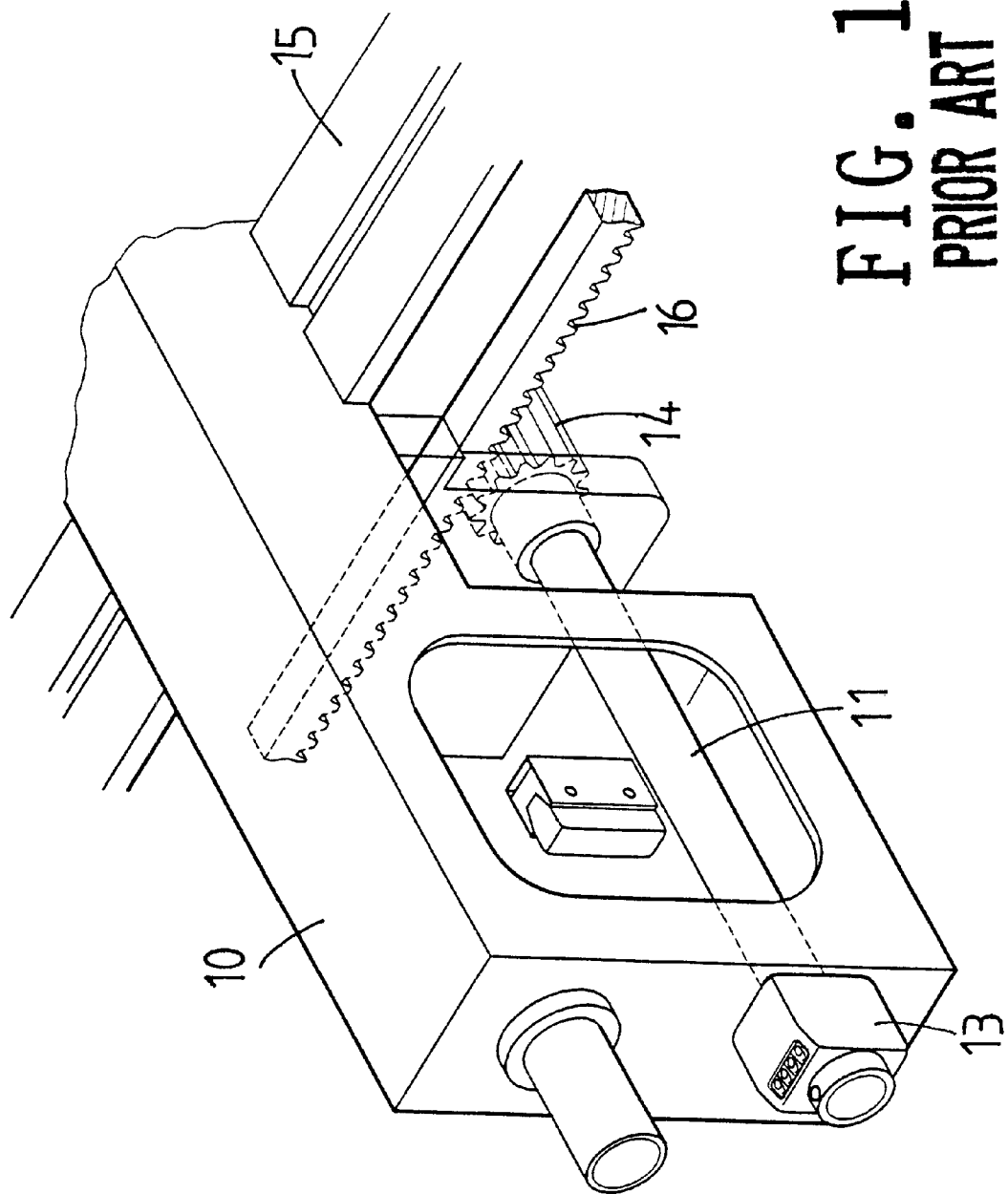
FIG. 1 is a perspective view to show a conventional displacement measuring device.
Figure 2:
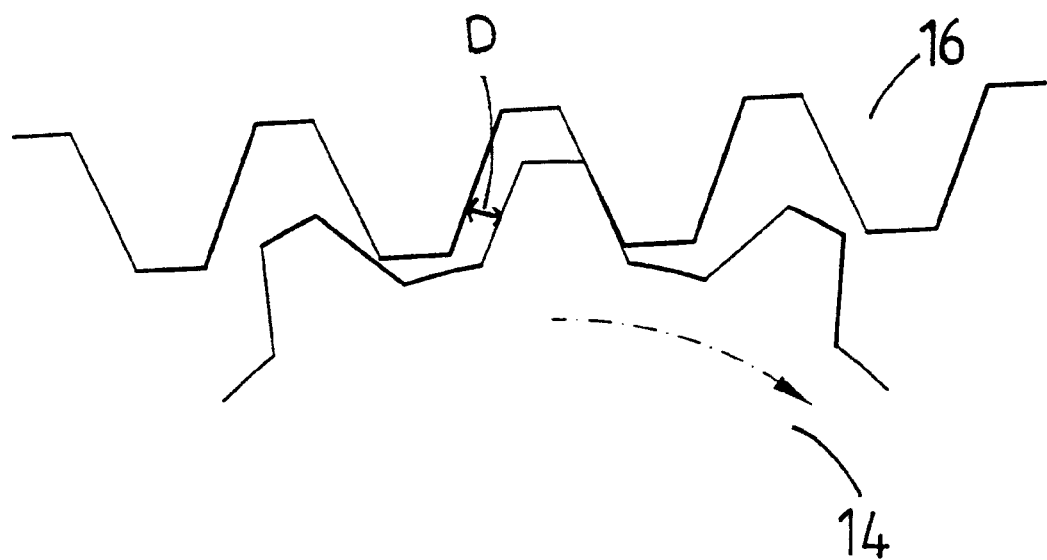
FIG. 2 shows a gap is defined between the rack and the gear on the shaft of the conventional displacement measuring device.
Figure 3:
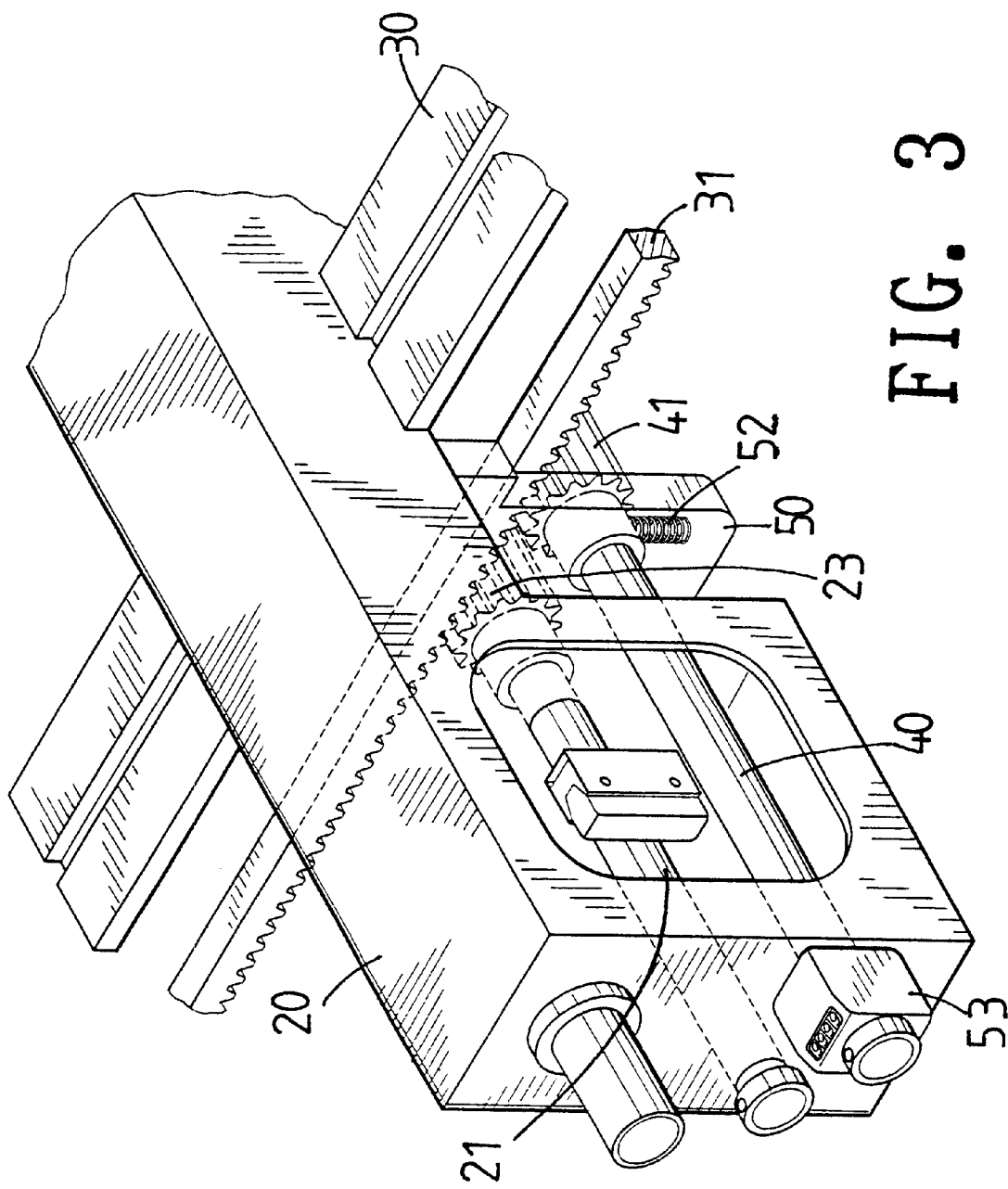
FIG. 3 is a perspective view to show the displacement measuring device of the present invention.
Figure 4:
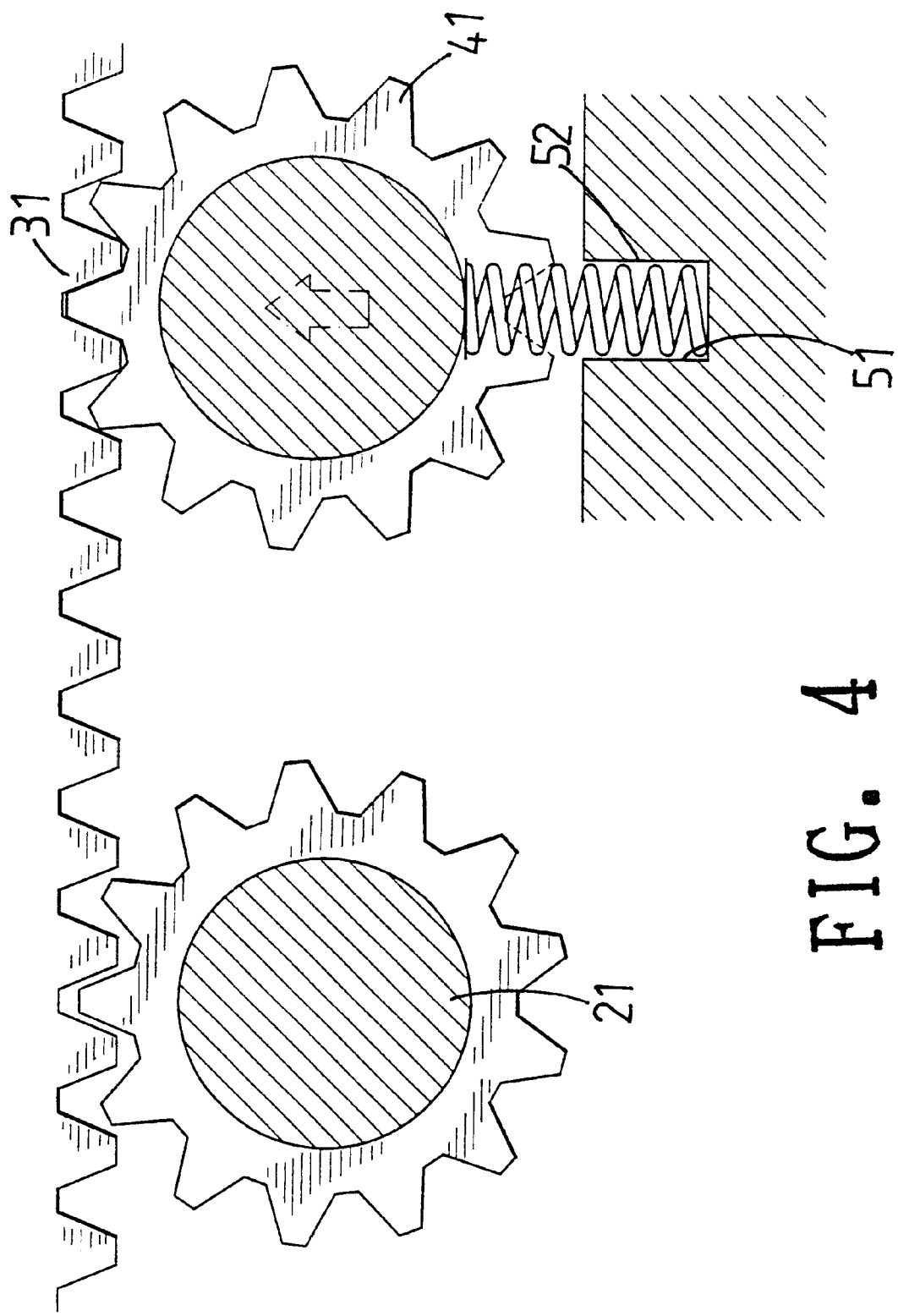
FIG. 4 shows the second shaft is pushed by a spring and the second gear on the second shaft is snugly engaged with the rack.

Referring to FIGS. 3 and 4, the displacement measuring device of the present invention comprises a body 20 which is movable on a plurality of rails 30 and an extension portion 50 is connected to the body 20. The extension portion 50 includes a recess 51 and an end of a spring 52 is engaged in the recess 51.

A first shaft 21 is connected to the body 20 and is driven by a motor which is not shown and the body 20 is moved by the rotation of the first shaft 21. A first gear 23 is mounted to the first shaft 21. A second shaft 40 is connected to the body 20 and extends through the extension portion 50. A second gear 41 is connected to the second shaft 40. A rack 31 is engaged with the first gear 23 and the second gear 41. The spring 52 pushes the second shaft 40 so as to push the second gear 41 toward the rack 31. A counting member 53 is connected to an end of the second shaft 40 and calculates the number of the revolution of the second shaft 40. The sum of the displacement of the object 20 can be obtained by the product of the number of the revolution and the diameter of the second shaft 40.

Because of the spring 52 so that the teeth of the second gear 41 are snugly engaged with the rack 31. In other words, there is only a small gap between the teeth of the rack 31 and the second gear 41 and the number of the revolution of the second shaft 40 is a precise number that the second shaft 40 actually rotates.

While we have shown and described the embodiment in accordance with the present invention, it should be clear to those skilled in the art that further embodiments may be made without departing from the scope of the present invention.

What is claimed is:

1. A displacement measuring device comprising:

a body which is movable on a plurality of rails, an extension portion connected to the body and including a spring received therein;

a first shaft connected to the body and driving the body, a first gear mounted to the first shaft, a second shaft connected to the body and extending through the extension portion, a counting member and a second gear connected to the second shaft, and a rack engaged with the first gear and the second gear, the spring pushing the second shaft so as to push the second gear toward the rack.

2. The device as claimed in claim 1, wherein the extension portion includes a recess and an end of the spring is engaged in the recess.

* * * * *